July 28, 1959
C. L. SMOUSE
2,896,420
APPARATUS FOR CHARGING A REFRIGERATING SYSTEM WITH
A PREDETERMINED AMOUNT OF REFRIGERANT
Filed April 2, 1957
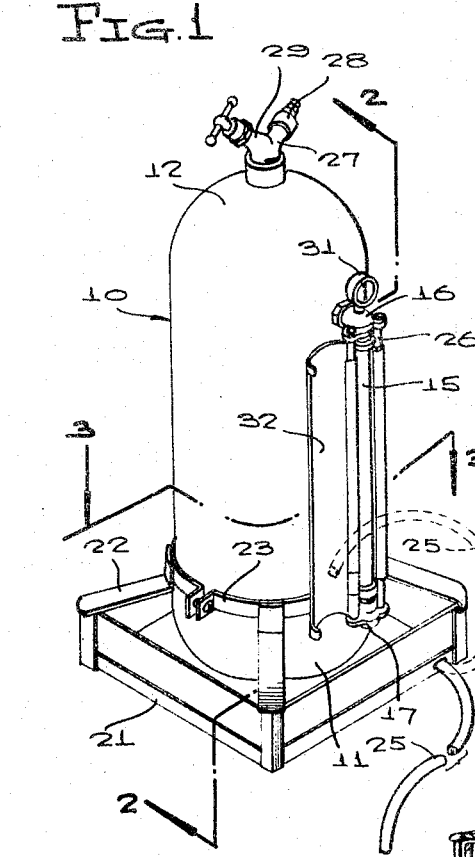
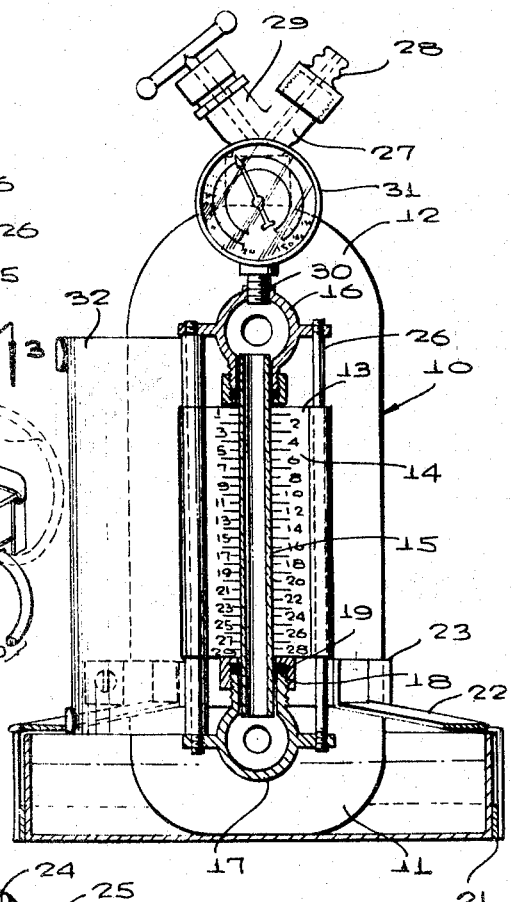
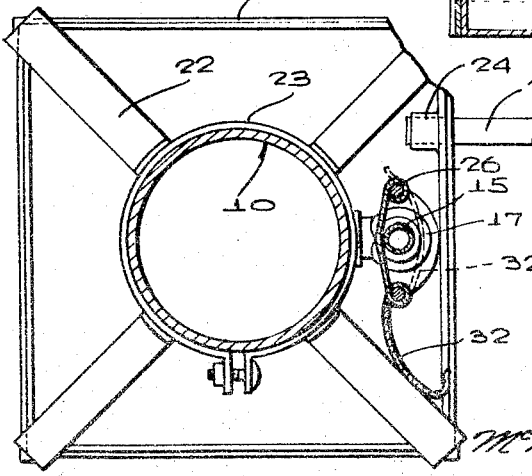
INVENTOR.
CHARLES L. SMOUSE
BY
McMorrow, Berman & Davidson
ATTORNEYS

United States Patent Office 2,896,420
Patented July 28, 1959

2,896,420

APPARATUS FOR CHARGING A REFRIGERATING SYSTEM WITH A PREDETERMINED AMOUNT OF REFRIGERANT

Charles L. Smouse, Bridgeport, W. Va.

Application April 2, 1957, Serial No. 650,177

1 Claim. (Cl. 62—125)

The present invention relates to an apparatus for charging a refrigerating system with a predetermined amount of refrigerant.

An object of the present invention is to provide an apparatus for charging a refrigerating system with a predetermined amount of refrigerant which lends itself to rapid and accurate charging of any type of refrigerating system with the exact amount of by weight of refrigerant as recommended by the manufacturer.

Another object of the present invention is to provide an apparatus for charging a refrigerating system with a predetermined amount of refrigerant, which apparatus is easily and readily portable, compact in size, sturdily constructed and of simple structure, and one economically feasible.

These and other objects and advantages of the present invention will be fully apparent from the following description when taken in connection with the annexed drawing, in which:

Figure 1 is a view in perspective of the apparatus according to the present invention;

Figure 2 is a sectional view, on an enlarged scale, taken on line 2—2 of Figure 1; and Figure 3 is a sectional view partially broken away, on an enlarged scale, taken on line 3—3 of Figure 1.

The apparatus for charging a refrigerating system with a predetermined amount of refrigerant comprises an upright closed receptacle, designated generally by the reference numeral 10, and having a bottom 11 and a top 12. The receptacle 10 is formed of rigid and relatively thick steel or other hard metal and is adapted to contain a body of gaseous refrigerant, such as Freon, in a liquefied state under high pressure. Extending exteriorly of the receptacle 10 is a vertically disposed liquid level scale 13 marked in volume graduations 14 corresponding to specific weights of a liquefied gaseous refrigerant contained within the receptacle 10, the graduations being determined when the refrigerant is at a predetermined temperature and predetermined pressure.

A transparent pressure-resistant tube 15 is positioned exteriorly of the receptacle 10 and extends vertically in parallel spaced relation with respect to the scale 13, and means connecting each of its upper and lower end portions in communication with the interior of the receptacle 10, as by angled tube mounts 16 and 17, respectively, each tube mount 16 and 17 including a suitable pressure-resistant gasket 18 and a nut 19 sealingly engaging the gasket 19 and sealing the tube 15 in the respective tube mounts 16 and 17. Each of the tube mounts 16 and 17 is connected in communication with the interior of the receptacle 10. The upper tube mount 16 is positioned at a point adjacent to and spaced below the top 12 of the receptacle 10.

Means is provided for applying heat to the receptacle 10 and comprises a shallow relatively large open top container 21 having a plurality of spaced upwardly sloping arms 22 terminating in a split ring 23 of a size to embracingly receive the lower end portion of the receptacle 10.

The container 21 is provided at a point adjacent its closed bottom with an opening with a nipple 24 soldered or welded over the opening and on the interior of the container 21, there being a short length of flexible hose 25 wedged into the nipple 24 and of a length such that it may be wedged by its other end portion remote from the nipple 24 behind the supporting frame 26 which extends between the tube mounts 16 and 17, the wedged position of the hose 25 being indicated in dotted lines in Figure 1.

A nozzle 27 projects from the top 12 of the receptacle 10 and has a coupling 28 thereon adapted to be connected to a refrigerating system by a flexible conduit, the conduit not being shown as not being a part of the present invention. An openable and closable valve 29 is connected in the nozzle 27 for controlling the discharge of the refrigerant from the receptacle 10.

Means is provided determining the pressure of the refrigerant within the receptacle 10 and comprises a pressure gauge carried by the receptacle 10 and connected by means of a nipple 30 to the upper tube mount 16, the gauge being designated by the reference numeral 31 in Figures 1 and 2. The gauge 31 has scale indicia thereon in graduation markings corresponding to the pressure of the enclosed refrigerant.

A protective shield 32 is mounted on the frame 26 for swinging movement about a vertical axis from the dotted line position covering the tube 15 to the full line position exposing the tube 15, as shown in Figure 3.

In use of the apparatus for charging a refrigerating system with a predetermined amount by weight of a gaseous refrigerant, the following steps are employed: First, the receptacle 10 is provided and is filled approximately to the top of the tube 15 with a body of gaseous refrigerant in liquefied state. The receptacle 10 is secured in a vertical position within the container 21 with its lower end resting on the bottom of the container 21 and the container 21 based on a level surface. Water, heated to a temperature of approximtaely 125 degrees F., is poured into the container 21 and the gauge 31 is observed. Heat of the water is transferred to the receptacle 10 and increases the temperature of the liquefied gas contained within the receptacle 10 and results in increasing the pressure of the evaporated gas within the receptacle 10 above the liquefied gas. Heating of the receptacle 10 to a temperature greater than that of the ambient air will result in increasing the pressure of the evaporated gas to a predetermined degree of pressure. For example, Freon 12, when heated to 82 degrees F., will increase the pressure of the gas in the container to 87 pounds per square inch.

With the pressure of the gas within the receptacle 10 at the predetermined pressure, 87 pounds per square inch, for example, as indicated by the reading of the gauge 31, the level of the body of liquefied gas within the receptacle 10 is observed through the tube 15 and noted. The apparatus is now ready for charging a refrigerating unit on either the high or low side of the unit.

When charging a refrigerating unit on the high side, the unit is first evacuated with a vacuum pump (not shown) in the conventional manner. Each make of unit requires a specific amount of refrigerant and this amount is inscribed on the unit, usually on the manufacturer's identification plate. The hot water which has been placed in the container 21 is now permitted to run out of the hose 25 to a place of disposal by disengaging the hose 25 from its wedged position behind the frame 26 and lowering of the free end of the hose 25 to a level beneath the bottom of the container 21. Next, the coupling 28 of the receptacle 10 is connected by a suitable conduit to the high side of the unit and the valve of the unit and the valve 29 are opened. The compressor of the unit remains idle and the refrigerant will run into the unit due to the pressure differential between the receptacle 10 and the unit, with the receptacle 10 and container 21 inverted.

When a multiple part of the predetermined amount of refrigerant has run into the unit, the valve 29 is closed and the receptacle 10 is then returned to its vertical position. If necessary, the pressure is returned to the previously stated predetermined pressure (87 pounds per square inch) by pouring hot water into the container 21. When the pressure returns to the predetermined pressure, the level of the liquefied gas in the tube 15 is again observed. The water may be again drained from the container 21 and the container 21 and the receptacle 10 inverted together and the valve 29 reopened to allow a further multiple part of the predetermined volume of refrigerant to be run into the unit. This is repeated until a predetermined amount has been admitted as determined by the readings of the tube 15, it being understood that the reading of the tube 15 is made only when the receptacle has been returned to a temperature greater than that of the ambient air at which the gauge 31 registers the predetermined pressure.

In a specific example, if the temperature of the unit being filled is 75 degrees F., and the temperature of the receptacle 10 is raised to 82 degrees F., which is greater than the temperature of the ambient air, the gauge 31 will read 87 pounds per square inch and the liquefied gas will run very fast into the high side of the evacuated unit without substantial change in the pressure or the temperature of the remaining gas in the receptacle if the amount of the liquefied gas charged into the unit is relatively small relative to the remaining liquefied gas in the receptacle 10.

In charging the low side of the unit, the receptacle 10 is filled to near the top of the tube 15 and the receptacle 10 is warmed to a temperature greater than the temperature of the ambient air until the gauge 31 reads a predetermined pressure, 87 pounds per square inch. The evaporated gas in the top of the receptacle 10 above the liquefied gas therein is permitted to flow into the unit which previously has had a vacuum pulled down or drawn by a vacuum pump in the conventional manner. A suitable hose connects the unit to the receptacle 10 and the valve 29 and the valve on the unit are both opened. The refrigerating unit compressor is operated and the evaporated gas in the top of the receptacle 10 is drawn into the unit from the receptacle 10.

As the liquefied gas evaporates and is admitted to the unit, the temperature of the receptacle and the remaining liquefied gas is lowered by the latent heat of evaporation of the gas in the receptacle 10 and any reading of the level of the liquefied gas in the tube 15 would result in an error in the calculation of the gas admitted to the unit as represented by the volume of the remaining liquefied gas in the receptacle 10. For this reason, the receptacle 10 is repeatedly warmed by pouring water into the container 21 until the aforesaid predetermined pressure is indicated on the gauge 31 and further multiple parts of the gas are permitted to flow into the unit until the desired amount has been admitted. Readings of the gauge 31 will indicate the pressure of the evaporated gas above the liquefied gas in the receptacle 10 and if the tube 15 is observed and the level of the liquefied gas therein is noted only when the gauge 31 registers the predetermined temperature, the volume of evaporated gas admitted into the unit will be accurately and efficiently calculated by the observation of the difference in levels of the liquefied gas in the tube 15.

This manner of charging a refrigerating system with a predetermined amount by weight of refrigerant enables the user to quickly and accurately charge such a system with the amount of refrigerant recommended by the manufacturer of the system. Previously, a charge of a refrigerant was admitted by a trial and error method and with prolonged periods of waiting by the mechanic to see whether or not a predetermined amount of refrigerant had actually entered the system. Other ways included alternatingly disconnecting the refrigerant supply in its container from the system and weighing the container to determine the amount of refrigerant dispensed. This entailed wasting of the refrigerant in gaseous form to clear the connecting conduit after each disconnect and further entailed the provision of accurate scales for the weighing of the refrigerant container. The present invention provides an apparatus for charging a refrigerating system, the apparatus being easily and readily portable requiring no scales and enabling the user thereof to charge a refrigerating system within a minimum length of time with no waiting to see whether the system would operate efficiently.

What is claimed is:

An apparatus for charging a refrigerating system with a predetermined amount by weight of refrigerant comprising a closed receptacle having a bottom and a top and adapted to contain a body of gaseous refrigerant in liquefied state, a vertically disposed liquid scale marked in volume graduations corresponding to specific weights of the liquefied gaseous refrigerant at a predetermined temperature and pressure positioned exteriorly of said receptacle and extending from the bottom of said receptacle to a point adjacent to and spaced below the top of said receptacle, a transparent pressure resistant tube positioned exteriorly of said receptacle and extending vertically in parallel spaced relation with respect to said scale, means connecting each of the upper and lower end portions of said tube in communication with the interior of said receptacle, a pressure gauge in the means connecting the upper end of said tube to the interior of said receptacle, a discharge nozzle projecting from the top of said receptacle and adapted to be connected to a refrigerating system, an openable and closable valve in said nozzle for controlling the discharge of said refrigerant from said receptacle, and means encasing the bottom end portion adjacent the bottom of said receptacle for heating said receptacle, said last-mentioned means embodying a shallow container adapted to contain a body of heated water.

References Cited in the file of this patent

UNITED STATES PATENTS

| | | |
|---|---|---|
| 2,066,334 | Chase | Jan. 5, 1937 |
| 2,214,699 | Wood | Sept. 10, 1940 |
| 2,525,807 | Lane et al. | Oct. 17, 1950 |
| 2,552,783 | Harper | May 15, 1951 |
| 2,689,463 | Arf | Sept. 21, 1954 |

OTHER REFERENCES

"Modern Electric and Gas Refrigeration," published by Goodheart-Willcox Company, for the United States Armed Forces (FM977), Copyright 1943, pages 336–338.